(12) United States Patent
Robbins

(10) Patent No.: US 6,171,184 B1
(45) Date of Patent: Jan. 9, 2001

(54) HEAT WINDOW SYSTEM

(76) Inventor: Jonathan E. Robbins, R.R. #3, Box 348, Muncy, PA (US) 17756

( * ) Notice: Under 35 U.S.C. 154(b), the term of this patent shall be extended for 0 days.

(21) Appl. No.: 09/352,102

(22) Filed: Jul. 14, 1999

(51) Int. Cl.[7] .................................................. B60S 1/54
(52) U.S. Cl. .................................................. 454/122
(58) Field of Search .................... 454/121, 122, 454/198

(56) References Cited

U.S. PATENT DOCUMENTS

| | | | |
|---|---|---|---|
| 2,389,704 | * 11/1945 | Villani | 454/122 |
| 2,445,413 | * 7/1948 | Webster | 454/122 |
| 3,715,966 | * 2/1973 | Miettinen | 454/124 |
| 3,794,809 | 2/1974 | Beck et al. . | |
| 3,947,618 | 3/1976 | Gruss . | |
| 4,010,304 | 3/1977 | Cohen . | |
| 4,820,902 | 4/1989 | Gillery . | |
| 5,070,230 | 12/1991 | Osada et al. . | |
| 5,466,911 | 11/1995 | Spagnoli et al. . | |

* cited by examiner

Primary Examiner—Harold Joyce
Assistant Examiner—Derek S. Boles
(74) Attorney, Agent, or Firm—Chase & Yakimo, LC

(57) ABSTRACT

A window system for defrosting the windows of a vehicle comprises a windshield assembly having first and second spaced-apart panes of glass with an interlayer of air space therebetween. A frame surrounds the panes and maintains the air space therebetween. An inlet extends through the bottom wall of the frame for entry of air between the windshield panes. An outlet extends through a side wall of the frame for discharging air from between the windshield panes. The system also includes a plurality of window assemblies, each window assembly including first and second panes with an air space therebetween. An inlet extends through one side of the window frame for entry of air between the window panes. An outlet extends through an opposed side of the window frame for discharge of the air therefrom. The inlets and outlets of the windshield and window assemblies are positioned such that air may freely pass between adjacent assemblies through channels extending through vehicle support posts. A vacuum type blower is mounted downstream from the windshield and window assemblies for drawings air from a vehicle heat source through each assembly.

15 Claims, 7 Drawing Sheets

HEAT WINDOW SYSTEM

BACKGROUND OF THE INVENTION

This invention relates generally to a heated window system and, more particularly, to a system for circulating warm air through interlayers of air in automobile windows.

When the windows of an automobile are covered with frost or frozen precipitation, a person must scrape the windows prior to driving. Most automobiles utilize a defroster which forces warm air through vents in the dashboard onto the interior surface of the front windshield for the purpose of melting frost, ice, or snow from the windshield. Some vehicles also include a rear defroster in which a series of thin wires coupled to a vehicle power source are embedded in the rear windshield for melting ice therefrom. Although assumably effective in operation, existing systems do not provide uniform heating of all the windows of the automobile or partially obstruct a driver's view of the road.

Thus, it is desirable to have a heating system which uniformly heats all the windows of a vehicle. It is further desirable to have a heating system which circulates warm air through interconnected window interlayer air spaces as well as into the passenger compartment of the vehicle.

SUMMARY OF THE INVENTION

In response thereto, I have invented a window heating system for a vehicle which includes a front windshield assembly having first and second spaced-apart panes of glass with an interlayer of air therebetween. A frame encircles the panes and maintains the spacing within the air space. An inlet extends through the bottom wall of the windshield frame to allow entry of air into the interlayer. An outlet extends through a side wall of the windshield frame for discharging air from the interlayer.

The system further includes a plurality of vehicle window assemblies that may be placed about the vehicle, e.g. on each side door. Each vehicle window assembly includes first and second spaced-apart panes with an interlayer of air space therebetween. A frame encircles the window assembly panes. An inlet extends through a first side of the vehicle window frame and an outlet extends through a second side thereof for entry and discharge of air, respectively. The inlets and outlets of the windshield assembly and vehicle window assemblies are positioned such that an air stream may pass therebetween through channels extending through vehicle support posts. The system may also include a rear windshield having a construction substantially similar to the front windshield. A vacuum-type blower is mounted in the trunk of the vehicle for drawing air through the windshield and window assemblies.

It is therefore a general object of this invention to provide a heating system for automobile windows which uniformly defrosts all of the windows of the automobile.

Another object of this invention is to provide a heating system, as aforesaid, which heats an interlayer of air between the dual panes of glass of each vehicle window.

Still another object of this invention is to provide a heating system, as aforesaid, in which the interlayer of each window communicates with the interlayer of the next adjacent window.

A further object of this invention is to provide a heating system, as aforesaid, which circulates air through each window from a front defroster blower to a rear vacuum type blower.

A still further object of this invention is to provide a heating system, as aforesaid, which can heat the passenger compartment of the vehicle with the warm air previously drawn through the window interlayers.

Yet another object of this invention is to provide a heating system, as aforesaid, in which an air stream is sealed within each window interlayer.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
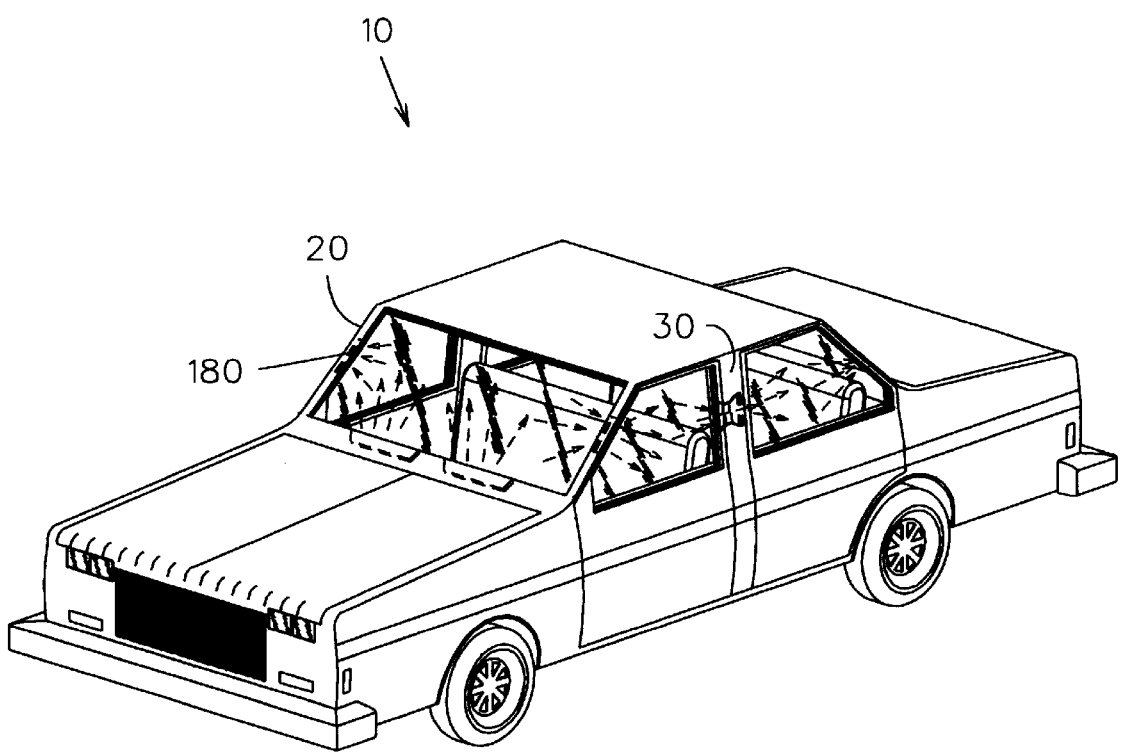
FIG. 1 is a front perspective view of a vehicle showing the circulation of air through the windshield heating system according to the present invention.
Figure 2:
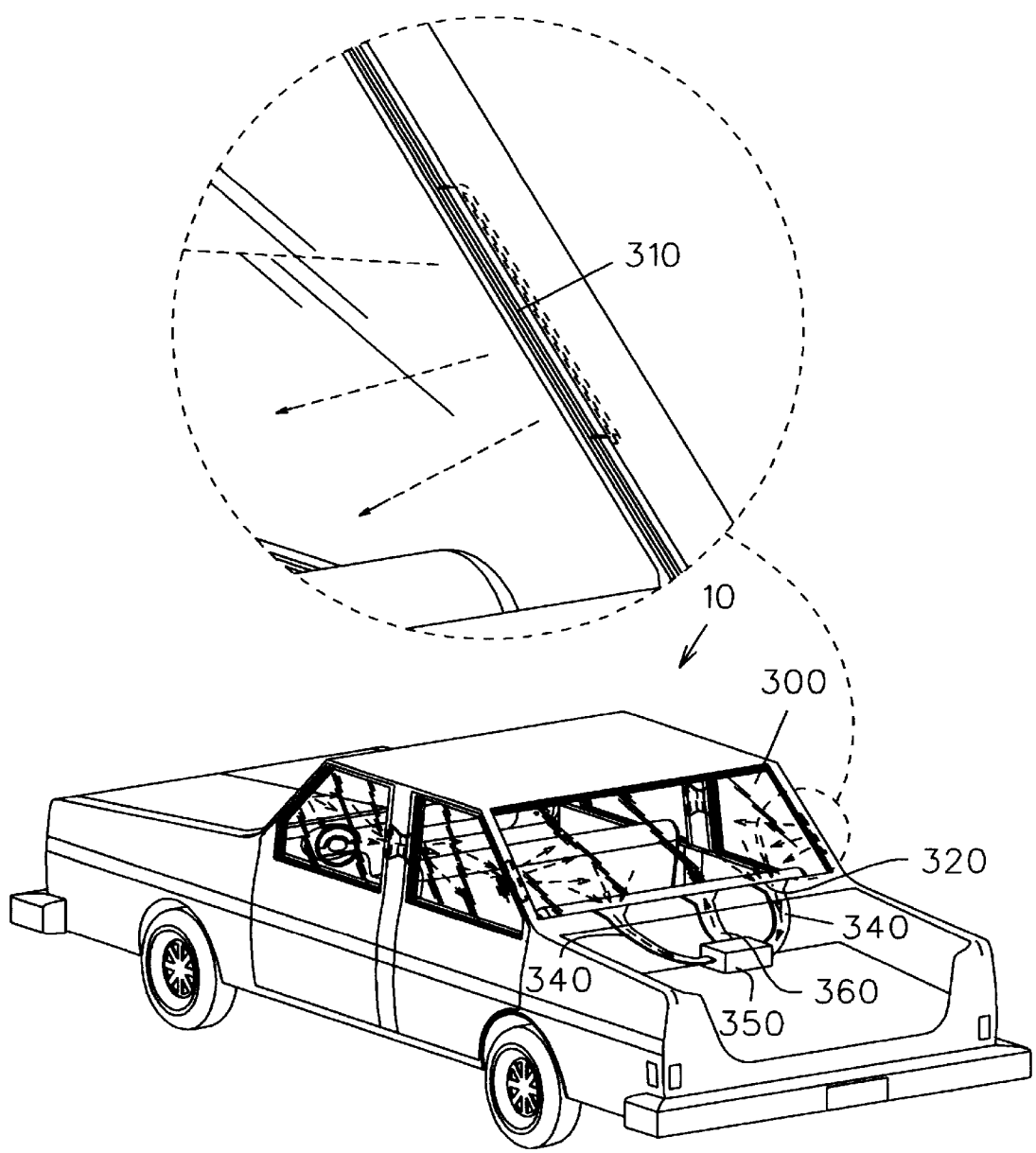
FIG. 2 is a rear perspective view of the vehicle of FIG. 1 with an enlarged isolated view of an inlet port in the rear windshield assembly.
Figure 3:
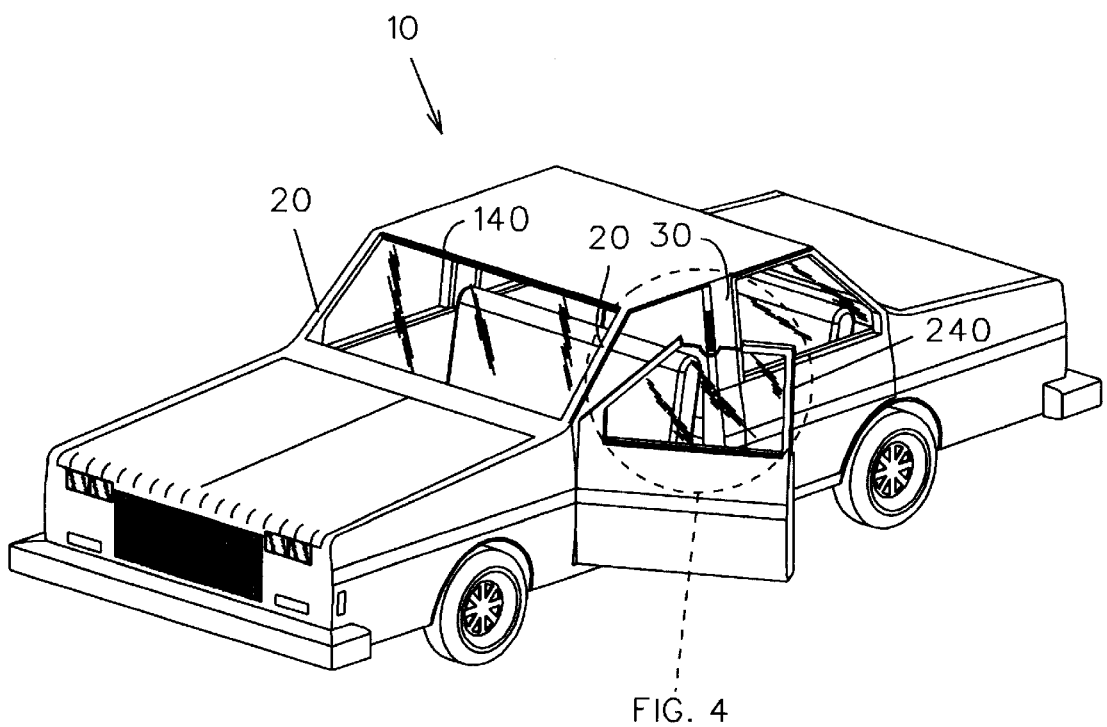
FIG. 3 is a perspective view as in FIG. 1 with the driver side door in an open position.

Turning more particularly to the drawings, FIGS. 1 and 2 show an automobile equipped with a window heating system according to the present invention, the directional arrows indicating the downstream flow of an air stream through each window of the vehicle, as to be further described below.

Figure 7:
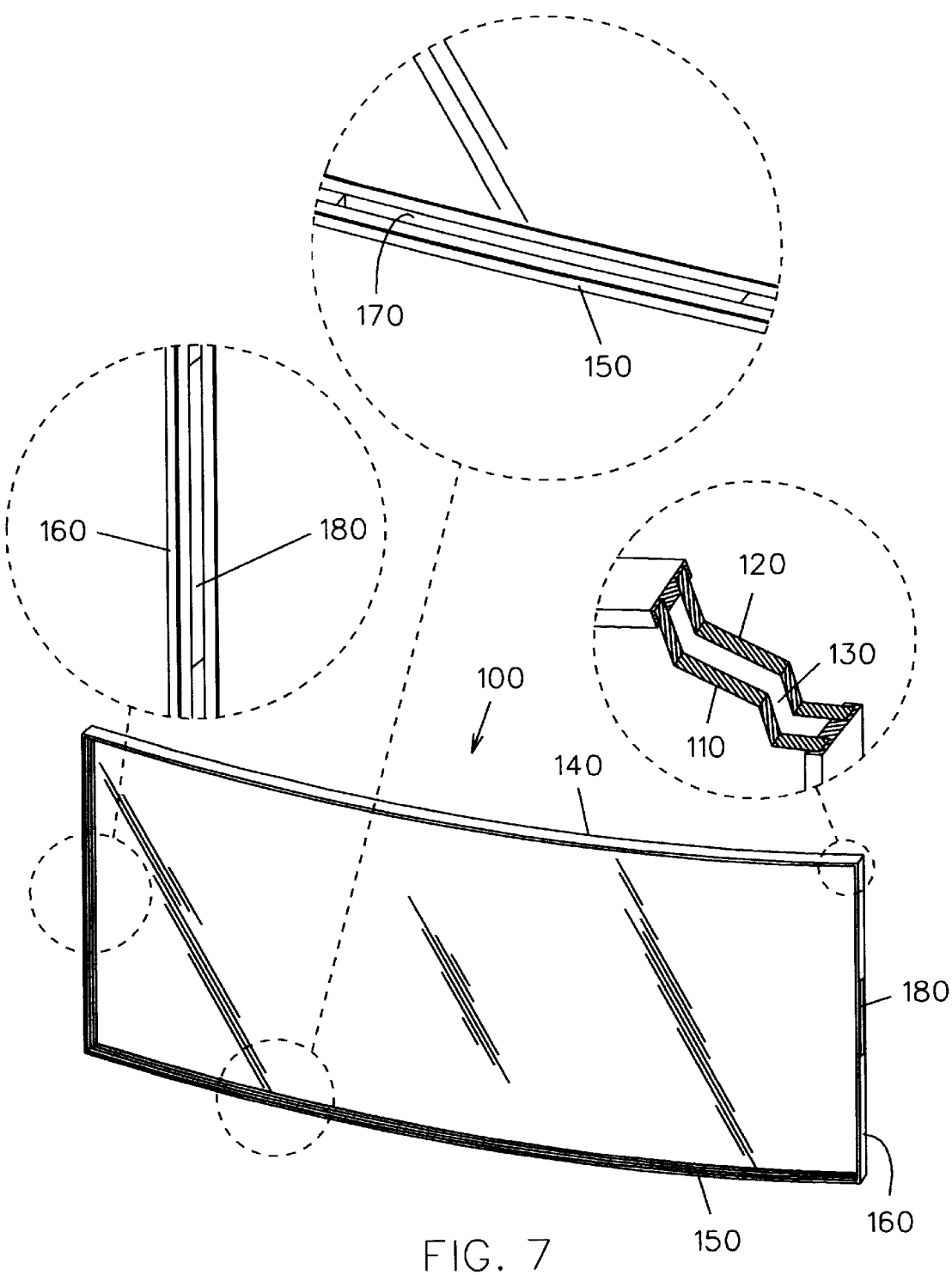
FIG. 7 is a perspective view of the front windshield assembly removed from the vehicle with enlarged isolated views of an outlet and inlet therein and a portion of the frame and windshield broken away.

The vehicle window system includes a front windshield assembly 100 having first 110 and second 120 spaced apart panes of glass of matching configuration with an interlayer 130 of air therebetween (FIG. 7). A frame 140 completely surrounds the glass panes 110, 120 and is mounted to a vehicle 10 in a conventional manner. Inlet ports 170 extend through a bottom side 150 of the windshield frame 140 for communicating heated air from the vehicle's defroster blower (not shown) into the windshield interlayer 130. Outlet ports 180 extend through opposed sides 160 of the windshield frame 140 and through the windshield support post 20 for discharging the air between the panes 110, 120 to the vehicle window assemblies, as to be further described below.

Figure 5:
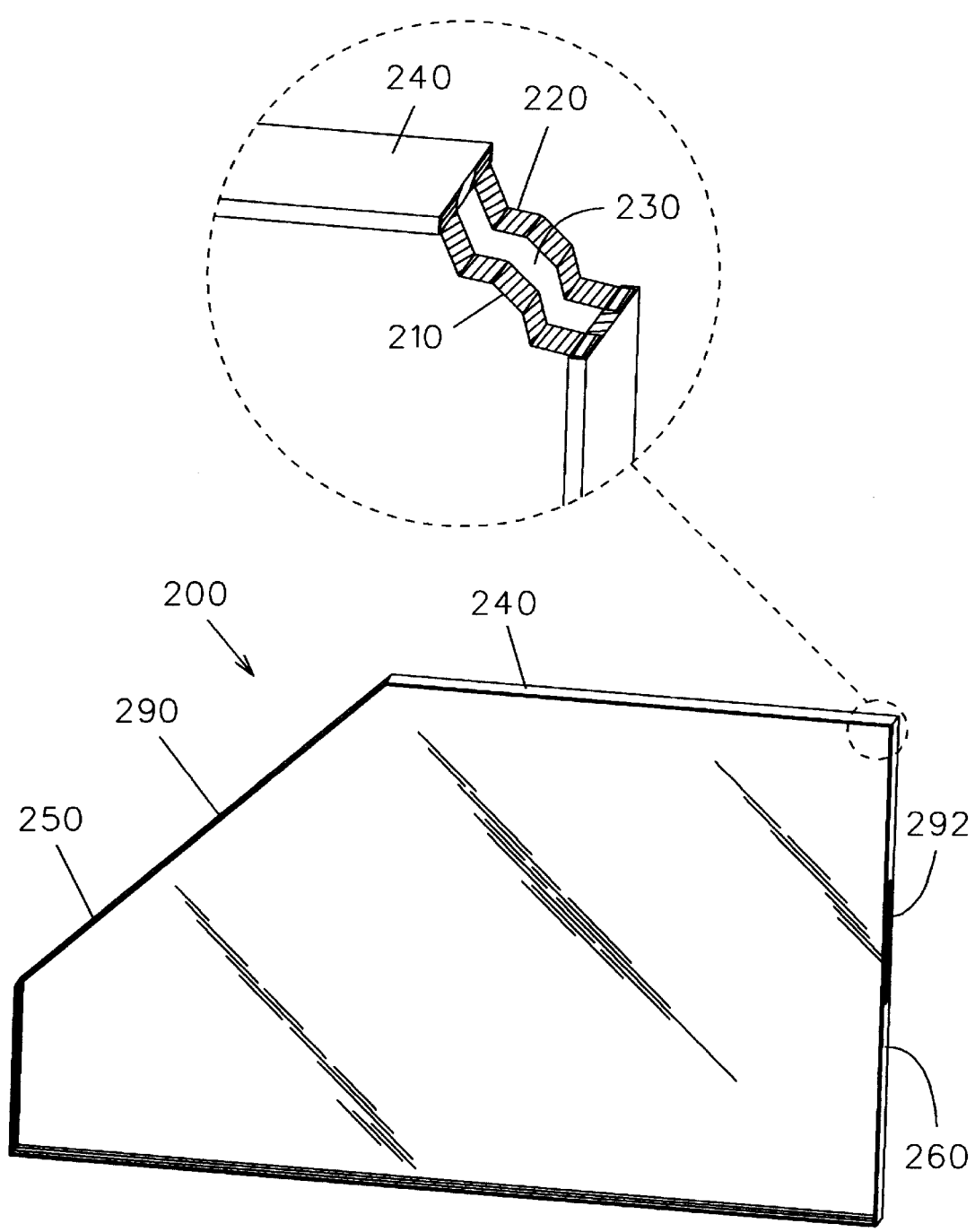
FIG. 5 is a perspective view of a window assembly with an enlarged isolated view of a corner thereof with a portion of the window frame and window broken away.

The window heating system includes a plurality of vehicle window assemblies 200 which correspond respectively to each door of the vehicle 10. Each window assembly 200 includes an outer pane 210, an inner pane 220 of matching configuration, and a thin hollow interlayer 230 of air sandwiched therebetween. The panes 210, 220 and interlayer 230 are bounded on all sides by a window frame 240 (FIG. 5). The window frame 240 includes an inlet port 290 extending through one side 250 of the window frame 240 for entry of an air stream into the interlayer 230 and downstream outlet port 292 extending through an opposed side 260 of the window frame 240 for discharge of the air stream therefrom.

Figure 4:
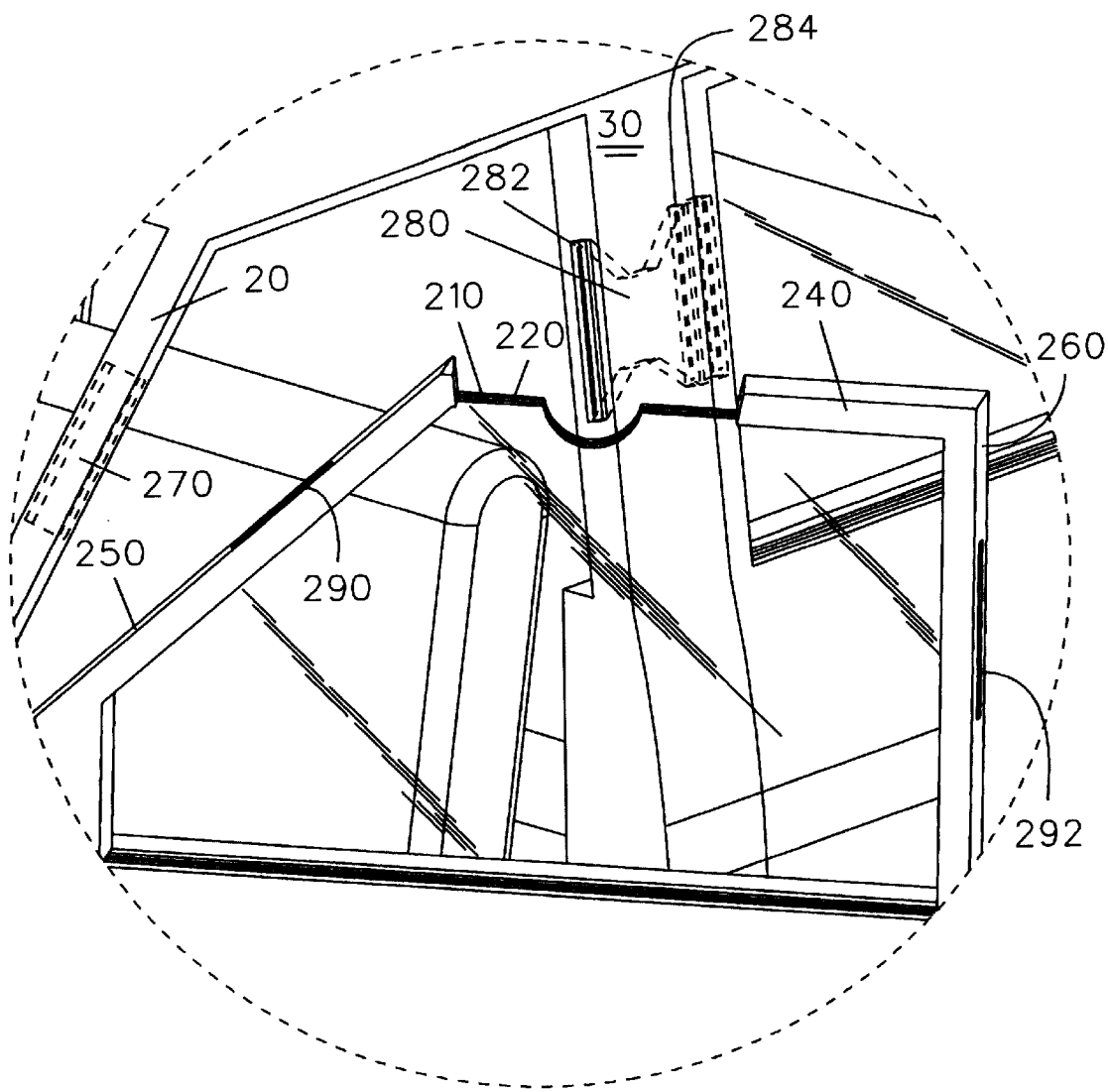
FIG. 4 is an enlarged isolated view of the driver door as in FIG. 3 with portions of the window frame and window removed.

Each outlet port 180 of the windshield assembly 100 registers with a first channel 270 which extends through a first vehicle support post 20. The first channel 270, in turn, registers with an inlet port 290 of an adjacent window assembly 200 (FIGS. 4 and 6) Similarly, each outlet port 292 of an upstream window assembly registers with aperture 282 of a second channel 280 which extends through the second support post 30 of the vehicle 10 such that an air stream may flow freely from the interlayer of one window assembly into the interlayer of the next adjacent window assembly. As shown with dashed lines in FIG. 4, each second channel 280 has a tapered configuration that decreases in circumference as it extends downstream from aperture 282 and then increases in circumference as it approaches the outlet aperture 284 adjacent the inlet port of the next adjacent downstream window. Accordingly, the velocity of the air stream entering the second channel 280 is first increased. The air stream is then expanded so as to be evenly distributed to the next adjacent interlayer.

Figure 6:
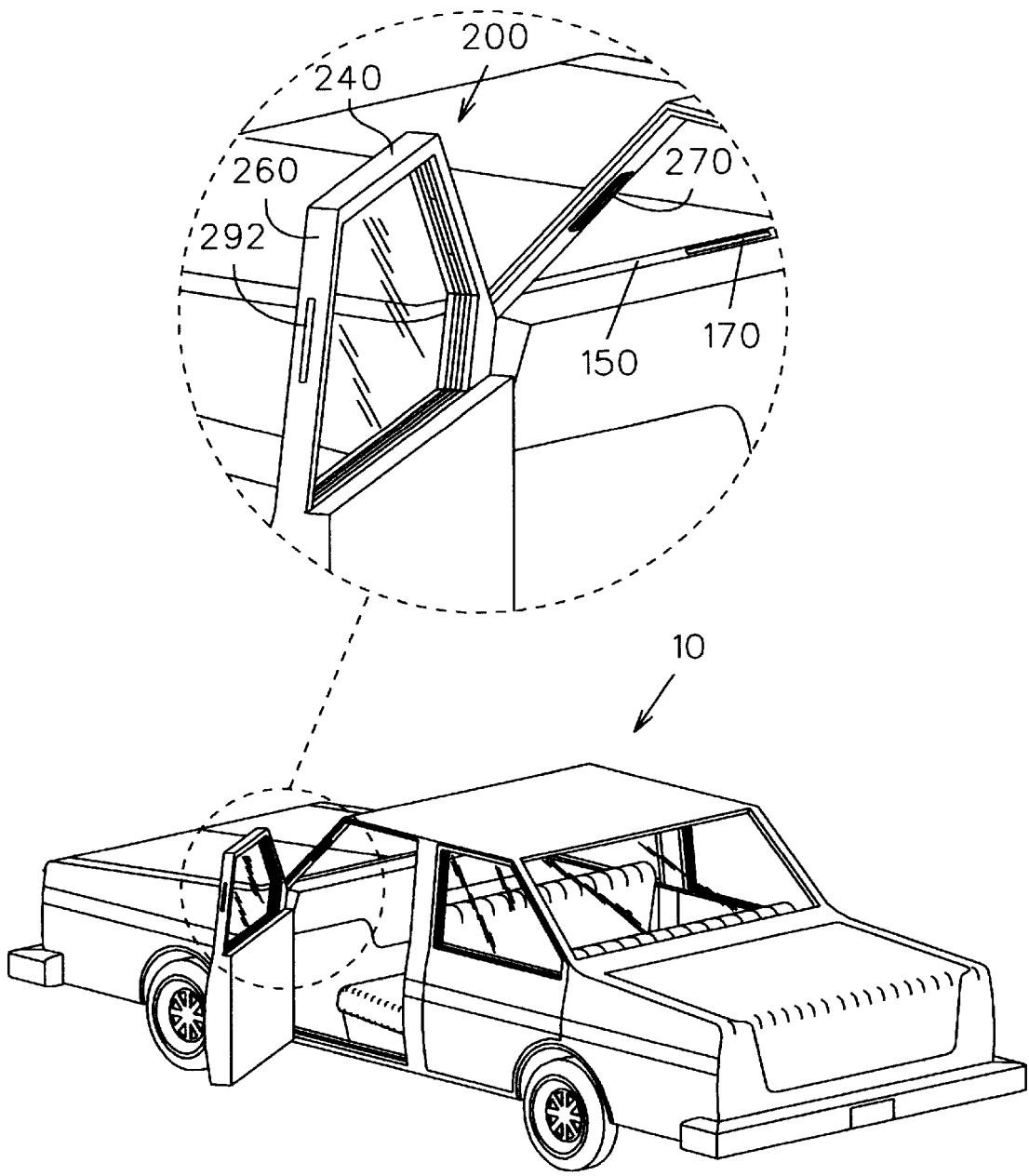
FIG. 6 is a rear perspective view of the vehicle of FIG. 1 with the driver's side door in an open position with an enlarged view of the door and first vehicle support post.

The heating system further includes a rear windshield assembly 300 having a construction substantially similar to that of the front windshield assembly described previously. The rear windshield assembly 300 includes inlet ports 310 which extend through the sides of the rear windshield frame 320 and communicate with the outlet ports of adjacent upstream window assemblies (FIG. 6). Outlet ports 320 extend through the bottom of the rear windshield frame 300 and are coupled to a vacuum type blower 350 mounted in the trunk compartment 40 (FIG. 2).

In operation, heated air is blown into the interlayer 130 of the front windshield assembly 100 by the vehicle defroster blower. The heated air is then drawn downstream through the window assemblies 200 and rear windshield assembly 300 by the vacuum type blower 350 that is housed in the trunk compartment 40 (FIG. 2). A pair of conduits 340 communicate air from the interlayer of the rear windshield assembly 300 to the blower 350. Air drawn into the blower 350 may be forced into the passenger compartment of the vehicle through channel 360.

Accordingly, it can be seen that the heated window system can defrost all of a vehicle's windows by circulating warm air from the vehicle's defroster through a hollow air space in each window.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A vehicle window air circulation system, comprising:
  a windshield window assembly having first and second spaced-apart panes presenting an air space therebetween;
  a frame about said windshield panes;
  an inlet in said windshield frame for entry of air therein between said panes;
  an outlet in said frame for downstream discharge of said air between said windshield panes; and
  means for urging said air into said inlet and discharging said air from said outlet;
  a plurality of vehicle window assemblies adapted for placement about the vehicle each said vehicle window assembly comprising:
    first and second panes with an air space therebeween;
    a frame about said vehicle window panes;
    an inlet in said vehicle window frame for entry of air therein between said vehicle window panes;
    an outlet in said vehicle window frame for discharge of air located between said vehicle window panes;
  means for communicating an inlet of each said vehicle window assembly with an outlet of adjacent vehicle window assembly, said communication means including:
    a first channel adapted for communication with a vehicle heat source and extending between said outlet of said windshield assembly and said inlet of said adjacent vehicle window assembly;
    a second channel extending between said outlet of said vehicle window assembly and an inlet of an adjacent downstream vehicle window assembly, said second channel including an upstream portion configured to increase the velocity of said air flowing therethrough and a downstream portion configured to evenly direct said air into said inlet of said adjacent downstream vehicle window assembly.

2. The system as claimed in claim 1 wherein said windshield frame includes a bottom wall and oppositely disposed side walls, said inlet extending through said bottom wall of said windshield frame, said outlet extending through at least one of said side walls of said windshield frame.

3. The system as claimed in claim 1 wherein said vehicle window frame includes first and second spaced apart sides, said inlet extending through said first side of said vehicle window frame and said outlet extending through said second side of said vehicle window frame.

4. The system as claimed in claim 1 wherein said outlet of said windshield assembly registers with said inlet of said adjacent vehicle window assembly for downstream discharge of said air between said first and second windshield panes to said air space between said window assembly panes.

5. The system as claimed in claim 3 further comprising:
  a rear windshield assembly having first and second spaced-apart panes presenting an air space therebetween;
  a frame about said windshield panes;
  at least one inlet in said rear windshield frame for entry of air therein between said panes from an outlet of an adjacent upstream window assembly;
  an outlet in said frame for downstream discharge of said air between said rear windshield panes; and
  means for communicating said at least one inlet of said rear windshield frame with said outlet of said upstream window.

6. The system as claimed in claim 1 wherein said urging means comprises at least a blower means mounted downstream of said outlet, and in communication therewith, said blower means for drawing air from said outlet.

7. The system as claimed in claim 6 wherein said urging means further comprises:
  a second blower means mounted upstream at said inlet for forcing air therein and between said window panes.

8. The system as claimed in claim 7 wherein said second blower means is adapted to draw air from a vehicle heat source, whereby to force heated air between said windshield panes.

9. A vehicle window system, comprising;
  a plurality of vehicle window assemblies adapted for placement about the vehicle, each said vehicle window assembly comprising;

first and second panes with an air space therebetween;

a frame about said vehicle window panes;

an inlet in said vehicle window frame for entry of air therein between said vehicle window panes;

an outlet in said vehicle window frame for discharge of air located between said vehicle window panes;

means for urging said air into said inlet and discharging said air from said outlet; and means for communicating an inlet of each said vehicle window assembly with an outlet of an adjacent vehicle window assembly, wherein said communicating means includes:

a first channel in communication with a vehicle heat source and extending through a first vehicle support post for directing heated air to said inlet;

a second channel extending through a second vehicle support post through which said heated air is directed from said outlet of said vehicle window assembly to an inlet of an adjacent vehicle window assembly.

10. The system as claimed in claim 9 wherein said urging means includes at least one blower means in Communication with said outlet of at least one of said vehicle window assemblies for drawing air therethrough.

11. The system as claimed in claim 10 wherein at least one of said inlets is adapted for communication with a vehicle heat source, whereby said urged air undergoes a heat transfer therewith.

12. The system as claimed in claim 11 wherein said second channel presents a pair of oppositely disposed open ends with an interior aperture therebetween, said interior aperture having a circumference less than the circumference of said open ends, said configuration increasing the velocity of said heated air flowing downstream therethrough and uniformly directing said heated air into said adjacent vehicle window assembly.

13. The system as claimed in claim 9 wherein said vehicle window frame includes first and second spaced-apart sides, said inlet extending through said first side, said outlet extending through said second side.

14. The system as claimed in claim 9 wherein one of said vehicle window assemblies comprises:

a windshield assembly having first and second spaced-apart panes presenting an air space therebetween;

a frame about said windshield panes;

an inlet in said windshield frame for entry of air therein between said panes;

an outlet in said frame for downstream discharge of said air between said windshield panes;

means for communicating said outlet of said windshield assembly with an inlet of at least one of said other vehicle window assemblies adjacent thereto.

15. The system as claimed in claim 9 wherein one of said vehicle window assemblies comprises:

a rear windshield assembly having first and second spaced-apart panes presenting an air space therebetween;

a frame about said windshield panes;

an inlet in said rear windshield frame for entry of air therein between said panes;

an outlet in said frame for downstream discharge of said air between said rear windshield panes; and means for communicating said inlet of said rear windshield frame with an outlet of at least one of said vehicle window assemblies adjacent thereto.

* * * * *